US010263771B2

(12) United States Patent
Tie et al.

(10) Patent No.: US 10,263,771 B2
(45) Date of Patent: Apr. 16, 2019

(54) TWO-WAY KEY SWITCHING METHOD AND IMPLEMENTATION DEVICE

(71) Applicant: China IWNCOMM Co., LTD., Xi'an, Shaanxi (CN)

(72) Inventors: Manxia Tie, Xi'an (CN); Qin Li, Xi'an (CN); Ning Bu, Xi'an (CN)

(73) Assignee: China IWNCOMM Co., LTD., Xi'an, Shannxi (CN)

( * ) Notice: Subject to any disclaimer, the term of this patent is extended or adjusted under 35 U.S.C. 154(b) by 0 days.

(21) Appl. No.: 14/420,342

(22) PCT Filed: Aug. 9, 2013

(86) PCT No.: PCT/CN2013/081157
§ 371 (c)(1),
(2) Date: Feb. 6, 2015

(87) PCT Pub. No.: WO2014/026570
PCT Pub. Date: Feb. 20, 2014

(65) Prior Publication Data
US 2015/0222427 A1 Aug. 6, 2015

(30) Foreign Application Priority Data
Aug. 13, 2012 (CN) .......................... 2012 1 0286523

(51) Int. Cl.
H04L 29/06 (2006.01)
H04L 9/08 (2006.01)
H04W 12/04 (2009.01)

(52) U.S. Cl.
CPC .......... *H04L 9/0822* (2013.01); *H04L 9/0891* (2013.01); *H04L 63/061* (2013.01); *H04W 12/04* (2013.01); *H04L 2209/24* (2013.01)

(58) Field of Classification Search
CPC ..... H04L 9/32; H04L 63/0892; H04L 63/068; H04W 12/04
(Continued)

(56) References Cited

U.S. PATENT DOCUMENTS 7,418,596 B1 * 8/2008 Carroll .................. H04L 63/068
380/247
7,526,092 B2 4/2009 Chesson et al.
(Continued)

FOREIGN PATENT DOCUMENTS

CN 1494252 A 5/2004
CN 101030849 A 9/2007
(Continued)

OTHER PUBLICATIONS

IEEE Standards Association—802.11 2012, Part 11 Wireless LAN Medium Access Controller (MAC) and Physical Layer Specification, Mar. 29, 2012, IEEE Society, Revision of IEEE 802.11-2007, 6.3.22.*

(Continued)

*Primary Examiner* — Ashokkumar B Patel
*Assistant Examiner* — William B Jones
(74) *Attorney, Agent, or Firm* — Wolf, Greenfield & Sacks, P.C.

(57) ABSTRACT

A two-way key switching method and an implementation device. The method includes: when acquiring a new key, any end in a communication link setting a new key transmitting direction to be unavailable and setting a new key receiving direction to be available; after it is presumed or determined that at least n opposite ends have acquired the new key and before an original key is invalid, the any end starting a first key switching process, to set the transmitting direction of the original key to be unavailable and set the new key transmitting direction to be available, where N≥n≥1, and N is the
(Continued)

total number of receiving sides corresponding to the transmitting side; according to a protection identifier of data transmitted from the opposite end, the any end selecting a valid key to perform deprotection; and after the data is successfully deprotected with the new key for the first time, the any end starting a second key switching process, to set the receiving direction of the original key to be unavailable. By limiting the sequence of each end on a communication link to perform key switching, the present invention ensures that each end can correctly deprotect data transmitted from an opposite end.

24 Claims, 5 Drawing Sheets

(58) Field of Classification Search
USPC .............................. 713/168, 150, 172, 161
See application file for complete search history.

(56) References Cited

U.S. PATENT DOCUMENTS

| 2003/0220107 | A1* | 11/2003 | Lioy | .................. H04L 63/0892 |
| | | | | 455/435.1 |
| 2008/0263647 | A1* | 10/2008 | Barnett | ................. H04L 9/0822 |
| | | | | 726/6 |
| 2011/0150223 | A1* | 6/2011 | Qi | ........................ H04W 12/04 |
| | | | | 380/273 |
| 2011/0194697 | A1 | 8/2011 | Pang et al. | |
| 2013/0243195 | A1* | 9/2013 | Kruegel | ................ H04L 63/065 |
| | | | | 380/270 |

FOREIGN PATENT DOCUMENTS

| CN | 101197663 A | 6/2008 | | |
| CN | 101466020 A | 6/2009 | | |
| CN | 101488854 A | 7/2009 | | |
| CN | 102104870 A | 6/2011 | | |
| WO | WO 03088617 A1 * | 10/2003 | ......... | H04L 63/0892 |
| WO | WO 2006069398 A1 * | 6/2006 | ......... | H04L 12/2898 |
| WO | WO 2012/040949 A1 | 4/2012 | | |

OTHER PUBLICATIONS

International Search Report dated Nov. 14, 2013 from corresponding International Application No. PCT/CN2013/081157.

Chinese Office Action, dated Mar. 2, 2016, from corresponding Chinese Application No. 201210286523.8.

Chinese Office Action (with English Summary), dated Jun. 23, 2016, from corresponding Chinese Application No. 201210286523.8.

[No Author Listed] IEEE Standard for Information Technology—Telecommunications and information exchange between systems—Local and metropolitan area networks—specific requirements. Part 11: Wireless LAN Medium Access Control (MAC) and Physical Layer (PHY) specifications. Amendment 6: Medium Access Control (MAC) Security Enhancement. IEEE Std 802.11i-2004. Jul. 23, 2004; 1-175.

* cited by examiner

TWO-WAY KEY SWITCHING METHOD AND IMPLEMENTATION DEVICE

CROSS-REFERENCE TO RELATED APPLICATIONS

This application is the national phase of International Application No. PCT/CN2013/081157, filed on Aug. 9, 2013, which claims priority to Chinese Patent Application No. 201210286523.8, filed with Chinese Patent Office on Aug 13, 2012, titled "TWO-WAY KEY SWITCHING METHOD AND IMPLEMENTATION DEVICE", which applications are hereby incorporated by reference to the maximum extent allowable by law.

FIELD

The disclosure relates to a field of key, and in particular to a two-way key switching method and an implementation device thereof.

BACKGROUND

In wireless network, a passive optical network, a power line communication network, and even a wired network, researchers commonly adopt a key to protect security of the communication data, such that confidentiality of the communication data is ensured by protection, and integrality of data is ensured by calculating an integrity check value, so as to prevent communication data in communication network from being eavesdropped or altered by illegals. It is necessary for a sender and a receiver of the data to know the key in those mechanisms for protecting the security of the data.

In order to prevent the key from being obtained by an illegal user by analyzing the intercepted data and thereby prevent the communication data from being obtained or altered by the illegal user, the key needs to be updated frequently. There are many ways to update the key. However, many key update mechanisms merely solve the problem how the two communicating parties obtain a new key, but do not concern the problem on how to switch between the original key and the new key by the sender and the receiver. Generally, since the two communicating parties switch to the new key at different time instants, a communication packet sent by the sender cannot be de-protected by the receiver if the switching is performed inappropriately.

SUMMARY

A two-way key switching method and an implementation device thereof are provided according to the disclosure to enable a receiver to correctly de-protects a communication packet sent by a sender.

The disclosure provides the following solutions.

A two-way key switching method is provided, which includes:

setting, by either end in a communication link, a new key as unavailable in a sending direction and available in a receiving direction, and keeping, by the either end, an original key as available in the sending direction and available in the receiving direction, after reception of the new key and before it is deduced or determined that the new key is obtained by at least n opposite ends;

starting, by the either end, a first key switching process after reception of the new key and it is deduced or determined that the new key is obtained by at least n opposite ends, while before the original key becomes invalid; wherein the first key switching process comprises setting the original key as unavailable in the sending direction and setting the new key as available in the sending direction, where $N \geq n \geq 1$, and N is a total number of receivers corresponding to a sender;

selecting, by the either end, a valid key according to a protection identifier of data sent by the opposite end to de-protect the data; and starting, by the either end, a second key switching process, after the data sent by the opposite end is successfully de-protected using the new key for the first time, wherein the second key switching process comprises setting the original key as unavailable in the receiving direction.

A device for implementing two-way key switching is provided, which includes:

a first key obtaining unit configured to obtain a new key;

a first key updating unit configured to set a new key as unavailable in a sending direction and set the new key as available in a receiving direction, and keep an original key as available in the sending direction and keep the original key as available in the receiving direction, after the new key is obtained by the device, while before it is deduced or determined that the new key is obtained by at least n opposite ends;

a first key switching unit configured to start a first key switching process, after the new key is obtained and it is deduced or determined that the new key is obtained by at least n opposite ends, while before the original key becomes invalid; wherein the first key switching process comprises setting the original key as unavailable in the sending direction and set the new key as available in the sending direction, where $N \geq n \geq 1$, and N is a total number of receivers corresponding to a sender;

a protection unit configured to protect data to be sent to the opposite end using the original key, after the new key is set as unavailable in the sending direction and the original key is set as available in the sending direction, or protect data to be sent to the opposite end using the new key, after the original key is set as unavailable in the sending direction and the new key is set as available in the sending direction;

a de-protection unit configured to select a corresponding key according to a protection identifier of the data sent by the opposite end to de-protect the data; and a second key switching unit configured to start a second key switching process, after the data sent by the opposite end is successfully de-protected using the new key for the first time, wherein the second key switching process comprises setting the original key as unavailable in the receiving direction.

A device for implementing two-way key switching is further provided, which includes:

a second key obtaining unit configured to obtain a new key according to a first key updating message comprising new key information, wherein the first key updating message is sent by an opposite end upon receiving the new key beforehand;

a second key updating unit configured to set the new key as unavailable in a sending direction and set the new key as available in a receiving direction, and keep an original key as available in the sending direction and keep the original key as available in the receiving direction, when the new key is obtained;

a third key switching unit configured to start a first key switching process at a time instant of a second time interval after the new key is obtained according to the first key updating message; wherein the first key switching process comprises setting the original key as unavailable in the sending direction and setting the new key as available in the sending direction;

a protection unit configured to protect data to be sent to the opposite end using the original key, after the new key is set as unavailable in the sending direction and the original key is set as available in the sending direction, or protect data to be sent to the opposite end using the new key, after the original key is set as unavailable in the sending direction and the new key is set as available in the sending direction;

a de-protection unit configured to select a corresponding key based on a protection identifier of the data sent by the opposite end to de-protect the data; and a fourth key switching unit configured to start a second key switching process, after the data sent by the opposite end is successfully de-protected using the new key for the first time, wherein the second key switching process comprises setting the original key as unavailable in the receiving direction;

Wherein the second time interval is not great than a remaining valid period of the original key.

In the present disclosure, either end in a communication link sets a new key as unavailable in a sending direction when the new key is obtained, and start a key switching process after it is deduced or determined that the new key is obtained by the opposite end, such that the new key is set as available in the sending direction and an original key is set as unavailable in the sending direction, and thereby avoiding that the either end receives a communication packet protected using the new key by the opposite end before the new key is received by the either end, which causes that the communication packet cannot be de-protected. And the either end set both the new key and the original key as available in a receiving direction, such that the either end can de-protect the communication packet protected using the original key and sent by the opposite end and a communication packet protected using the new key by the opposite end after a key is switched to the new key. Therefore, in the present disclosure, a problem that the communication packet sent by the opposite end can not be de-protected is solved by defining an order to switch a key in the sending direction and the receiving direction for the either end.

BRIEF DESCRIPTION OF THE DRAWINGS

In order to illustrate the technical solutions according to the embodiments of the present disclosure or in the prior art more clearly, drawings to be used in the description of the prior art or the embodiments will be described briefly hereinafter. Apparently, the drawings described hereinafter are only some embodiments of the present disclosure, and other drawings may be obtained by those skilled in the art according to those drawings without creative labor.

DETAILED DESCRIPTION OF THE EMBODIMENTS

The technical solutions in the embodiments of the present disclosure will be described clearly and completely hereinafter in conjunction with the drawings in the embodiments of the present disclosure. Apparently, the described embodiments are only a part but not all of the embodiments of the present disclosure. All the other embodiments can be obtained by those skilled in the art on the basis of the embodiments of the present disclosure, which fall within the scope of protection of the present disclosure.

It should be noted that, in a prior communication art, a key includes a one-way key and a two-way key. The two-way key is used to protect data transmitted between the communication parties, and a key which is used to encrypt data to be sent by an entity to an opposite entity or calculate an integrity check is the same as a key which is used to decrypt data received from the opposite entity or verify an integrity check. The one-way key is only used to protect data in one direction, and a key which is used to encrypt data to be sent by an entity to an opposite entity or calculate an integrity check is not the same as a key which is used to decrypt data received from the opposite entity or verify an integrity check.

Only a two-way key switching will be introduced in the embodiment of the present disclosure.

Figure 1:
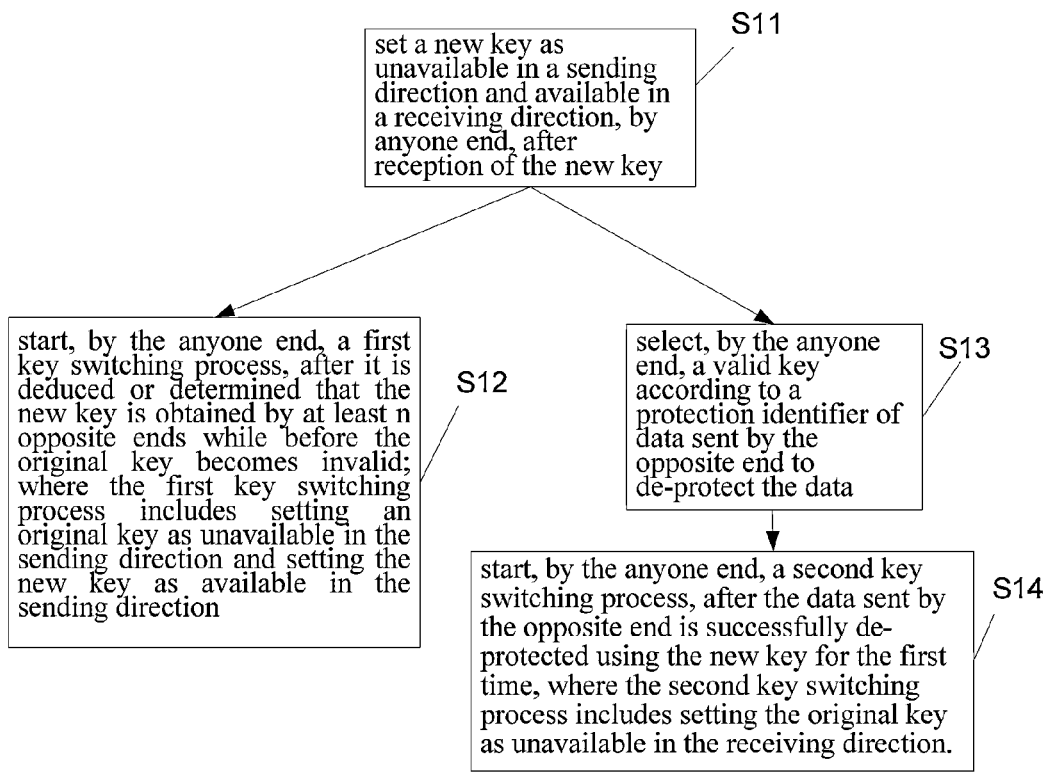
FIG. 1 is a schematic flow chart of a method according to a first embodiment of the present disclosure.

Referring to FIG. 1, a two-way switching method is provided according to a first embodiment of the present disclosure, which includes following steps S11, S12, S13 and S14.

In step S11, a new key is set as unavailable in a sending direction and available in a receiving direction, and an original key is kept as available in the sending direction and available in the receiving direction, by either end in a communication link, after the new key is obtained by the either end while before it is deduced or determined that the new key is obtained by at least n opposite ends.

In the disclosure, the key refers to a key for protecting the data to be sent, i.e. encrypting or calculating an integrity check, and for de-protecting the received data, i.e. decrypting or verifying an integrity check.

Either end in a communication link in the disclosure is a home end or an opposite end for each other. Specifically, for each end, a key for protecting the data to be sent is the same as a key for de-protecting the received data. For example, assuming that communication parties are entities A and B, if a key used by the entity A to protect data to be sent to the entity B is 1, a key used by the entity A to de-protect data received from the entity B is 1.

In the disclosure, a key available in a sending direction means that the key can be used to protect data, and a key unavailable in a sending direction means that the key cannot be used to protect data. While, a key available in a receiving direction means that the key can be used to de-protect data, a key unavailable in a receiving direction means that the key cannot be used to de-protect data.

For either end in a communication link, a new key may be not obtained by an opposite end when the new key is obtained by the either end, so a communication packet protected using the new key may not be de-protected by the opposite end if the new key is set as available in a sending direction directly. Thus, in the disclosure, the new key is set as unavailable in the sending direction, by either end, after the new key is obtained. And in this case, the data to be sent to the opposite end is still protected by the end using the original key.

In the prior art, several keys may be stored in each end, and a corresponding key may be selected according to a protection identifier of the received data to de-protect the received data. In the disclosure, the protection identifier is information such as a key identifier or a key index which is used to identify that the data is protected by using which key.

For either end in a communication link, it may not be able to determine when a key is switched at the opposite end, but it can be ensured that the data sent by the opposite end and protected using either an original key or a new key can be de-protected by the either end by setting both the original key and the new key as available in a receiving direction for the either end.

In step S12, a first key switching process is started, by the either end, after the new key is obtained and it is deduced or determined that the new key is obtained by at least n opposite ends, while before the original key becomes invalid; wherein the first key switching process includes setting the original key as unavailable in the sending direction and setting the new key as available in the sending direction. Where N≥n≥1, and N is a total number of receivers corresponding to a sender.

As can be seen in step S11, a new key is set as available in the receiving direction by the either end upon reception the new key, so it is deduced or determined that the new key is available in the receiving direction for the opposite end if it is deduced or determined that the new key is obtained by the opposite end. Thus the new key can be used to de-protect a communication packet by the opposite end at any time instant after the new key is set as available in the receiving direction. In other words, a key switching process may be performed by the anyoneeither end at any time instant after the new key is set as available in the receiving direction, so that the data can be protected using the new key.

A key has a certain lifetime in use, so a first key switching process should be started by the either end before the original key becomes invalid.

In step S13, a valid key is selected, by the anyone end according to a protection identifier of data sent by the opposite end to de-protect the data.

The opposite end may have performed the first key switching process such that data is protected using the new key, or the opposite end may not perform the first key switching process such that the data is protected using the original key, after the new key is set as available in the receiving direction by the either end, therefore the either end may detect a protection identifier of the data received from the opposite end and select a corresponding key to de-protect the received data according to the protection identifier. Specifically, the original key is selected to de-protect the received data in a case that it is determined that the data is protected using the original key according to the protection identifier, or the new key is selected to de-protect the received data in a case that it is determined that the data is protected using the new key according to the protection identifier.

In step S14, a second key switching process is start, by the either end, after the data is successfully de-protected using the new key for the first time, wherein the second key switching process comprises setting the original key as unavailable in the receiving direction.

The fact that the data is successfully de-protected using the new key for the first time means that the key switching process has been performed by the opposite end, so the either end can perform a key switching process correspondingly, i.e. setting the original key as unavailable in the receiving direction.

A packet loss may occur usually in communication, so a communication packet de-protected by either end using the new key for the first time may not be a first packet protected using the new key and sent by the opposite end.

For an end in a communication link, the first key switching process is performed and a valid key is selected to de-protect data only after the new key is obtained, and thereby a second key switching process is performed after the data is de-protected successfully. Accordingly, for an end, steps S12 and S13 are performed after step S11, step S14 is performed after step S13, and there is no precedence relationship between step S12 and step S13.

In a second embodiment of the present disclosure, the two-way key switching method will be described in detail, in a case that both ends in the communication link are entity A and entity B, an original key is Key0, and a new key is Key1. For the convenience of description, in the following example, tx indicates a sending direction, rx indicates a receiving direction, enable=1 indicates a key is available, and enable=0 indicates that a key is unavailable, such as Key0.rx.enable=1 indicates that an original key is available for a corresponding entity in a receiving direction, and Key0.rx.enable=0 indicates that a new key is unavailable for a corresponding entity in a receiving direction.

Figure 2:
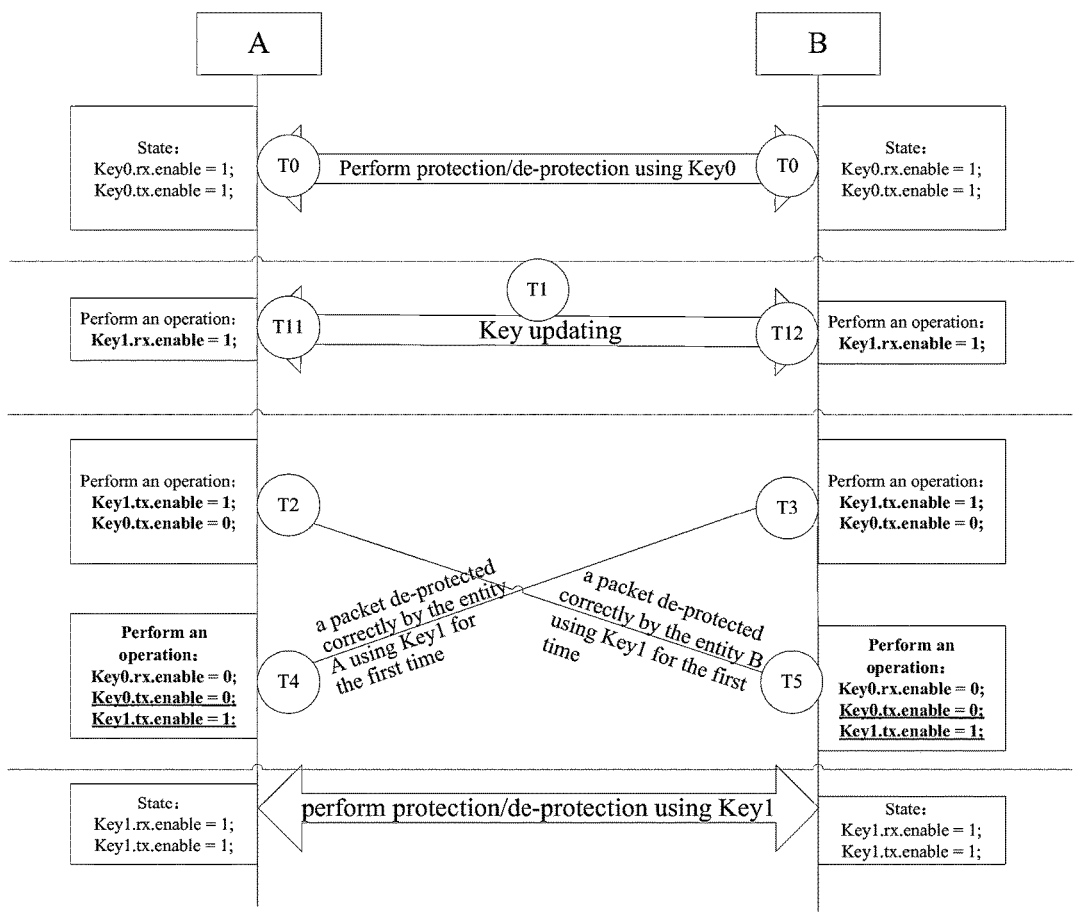
FIG. 2 is a schematic flow chart of a method according to a second embodiment of the present disclosure.

Referring to FIG. 2, at a time instant T0, an original key is available for both the entity A and the entity B in both the sending direction and the receiving direction. Data to be sent by the entity A to the entity B and data received by the entity A from the entity B are protected using the original key Key0, and data to be sent by the entity B to the entity A and data received by the entity B from the entity A are protected using the original key Key0.

At a time instant T1, a key updating process is performed by the entity A and the entity B to ensure that the new key Key1 is obtained by the entity A and the entity B. It should be noted that, the time instant when the new key Key1 is obtained by the entity A may be not the same as the time instant when the new key Key1 is obtained by the entity B. Specifically, at a time instant T11, the new key is set as unavailable in the sending direction and as available in the receiving direction by the entity A (meanwhile, the original key is kept as available in the sending direction and as available in the receiving direction by the entity A), such that data to be sent by the entity A to the entity B is still protected using the original key Key0, while the original key or the new key can be selected to de-protect data received from the entity B according to a protection identifier of the data. At a time instant T12, the new key is set as unavailable in the sending direction and as available in the receiving direction by the entity B (meanwhile, the original key is kept as available in the sending direction and as available in the receiving direction by the entity B), such that data to be sent by the entity B to the entity A is still protected using the original key Key0, while the original key or the new key can be selected to de-protect data received from the entity A according to a protection identifier of the data.

At a time instant T2, it is deduced or determined by the entity A that the new key is obtained by the entity B, i.e. the new key is available for the entity B in the receiving direction, and a first key switching process is performed by the entity A, i.e. the new key Key1 is set as available in the sending direction and the original key Key0 is set as unavailable in the sending direction by the entity A. Thereafter, if a packet is to be sent from the entity A to the entity B, the packet is protected using the new key Key1 and then sent to the entity B by the entity A.

At a time instant T3, it is deduced or determined by the entity B that the new key is obtained by the entity A, i.e. the new key is available for the entity A in the receiving direction, and a first key switching process is performed by the entity B, i.e. the new key Key1 is set as available in the sending direction and the original key Key0 is set as unavailable in the sending direction by the entity B. If a packet is to be sent to the entity A, the packet is protected using the new key Key1 and then sent to the entity A by the entity B.

In a practical application, a precedence order by which the new key is obtained by the entity A and the entity B is not defined, so a precedence order of the time instant T2 and time instant T3 for performing the first key switching process by the entity A and the entity B is not defined.

At a time instant T4, it is determined by the entity A according to the detected identifier of the data that the data is protected using the new key, thereby the new key Key1 is selected to de-protect the data received from the entity B, and a second key switching process is started by the entity A after the de-protection process is performed successfully for the first time, i.e. the original key Key0 is set as unavailable in the receiving direction.

A time instant when a de-protection process is performed by the entity A correctly must follow a time instant when the new key is set as available for the entity B in the sending direction, i.e. following a time instant when the first key switching process is performed by the entity B, so the time instant T3 is followed by the time instant T4.

At a time instant T5, it is determined by the entity B according to the detected identifier of the data that the data is protected using the new key, thereby the new key Key1 is selected to de-protect the data received from the entity A, and the second key switching process is started by the entity B after the de-protection process is performed successfully for the first time, i.e. the original key Key0 is set as unavailable in the receiving direction.

A time instant when a de-protection process is performed by the entity B correctly must follow a time instant when the new key is set as available for the entity A in the sending direction, i.e. following a time instant when the first key switching process is performed by the entity A, so the time instant T2 is followed by the time instant T5.

At this point, the entity A and the entity B each have completed the key switching process. The new key then is available for the entity A in both the sending direction and the receiving direction, and the new key is available for the entity B in both the sending direction and the receiving direction.

It should be noted that, for the same end, a time instant when the end starts the first key switching process after it is deduced or determined that the opposite end obtains the new key, may be earlier than a time instant when the de-protection process is performed correctly by the end, or may be later than a time instant when the de-protection process is performed correctly by the end. Taking the entity B in FIG. 2 for example, the time instant T3 may be earlier than the time instant T5, or may be later than the time instant T5.

In another embodiment of the present disclosure, if the time instant T5 when data protected using the new key Key1 and received from the entity A is de-protected by the entity B successfully for the first time is earlier than the time instant when the first key switching process is started by the entity B, i.e. the time instant T3 when the new key is set as available in the sending direction and the original key is set as unavailable in the sending direction. Since performing de-protection successfully means that the new key is used by the entity A to perform protection before the time instant T5, it is determined by the entity B that the new key is obtained by the entity A, and the first key switching process may be started by the entity B while the second key switching process is started at the time instant T5. Specifically, the first key switching process may be started by the entity B until the time instant T3.

In a communication network, there are two communication manners including a unicasting manner and a multicasting manner. Specifically, the unicasting manner means that communication data is sent by a single entity to another single entity. The multicasting manner means that communication data is sent by a single entity to at least two entities.

Specifically, in the case of multicasting, the new key may not be obtained by the multiple entities for receiving data at the same time, so the first key switching process is started, by either end in the communication link, after it is deduced or determined that the new key is obtained by all the opposite ends, in order to ensure that the de-protection processes are performed correctly by the above multiple entities, according to a preferred embodiment of the present disclosure.

In the present disclosure, there are several methods for obtaining a new key by each end in the communication link. For example, in a case that a new key is obtained by an end earlier than the opposite end, a first key updating message will be sent by the end obtaining the new key earlier to the opposite end such that the new key is obtained by the opposite end according to the first key updating message.

At this point, the new key is obtained by both the end obtaining the new key earlier and the opposite end, thus the new key is set as unavailable in the sending direction and the new key is set as available in the receiving direction by both ends.

It is deduced or determined by the end obtaining the new key earlier whether the new key is obtained by the opposite end after a first key updating message is sent by the end obtaining the new key earlier, and the first key switching process is started by the end obtaining the new key earlier before the original key becomes invalid, if it is deduced or determined by the end obtaining the new key earlier that the new key is obtained by the opposite end.

It is determined by the opposite end according to the received first key updating message that the new key is obtained by the other end sending the first key updating message, i.e. the end obtaining the new key earlier, such that the first key switching process can be started by the opposite end before the original key becomes invalid and after the new key is obtained by the opposite end according to the first key updating message. Specifically, a first key switching process may be started by the opposite end at a time instant of a second time interval after the new key is obtained according to the first key updating message, wherein the second time interval is not greater than remaining valid period of the original key.

It should be noted that, the first key switching process is directly started by the opposite end after the new key is obtained according to the first key updating message if the second time interval is zero, and the opposite end needs not to set the new key as unavailable in the sending direction.

In the present disclosure, there are several methods for the end obtaining the new key earlier to deduce that the new key is obtained by the opposite end. Following methods for starting the first key switching process by the end obtaining the new key earlier according to different deduction methods are provided according to a third embodiment of the present disclosure.

First Method

A key switching process is started, by the end obtaining the new key earlier, after a first time interval which is after the first key updating message is sent. The first time interval is greater than a transmission delay for the arrival of the first key updating message to an opposite end.

It takes certain time to transmit data over a communication link. Considering that a transmission delay may occur due to factors such as transmission distance and transmission bandwidth, delay time of the data transmission is determined in the prior art. It is considered that data has been transmitted to the opposite end if transmission time is greater than the delay time. Therefore, in the present disclosure, it is deduced that the message is obtained by the opposite end if the transmission time is greater than the delay time takes by the first key updating message to arrive at the opposite end, and thereby it is deduced that the new key is obtained by the opposite end.

Figure 3:
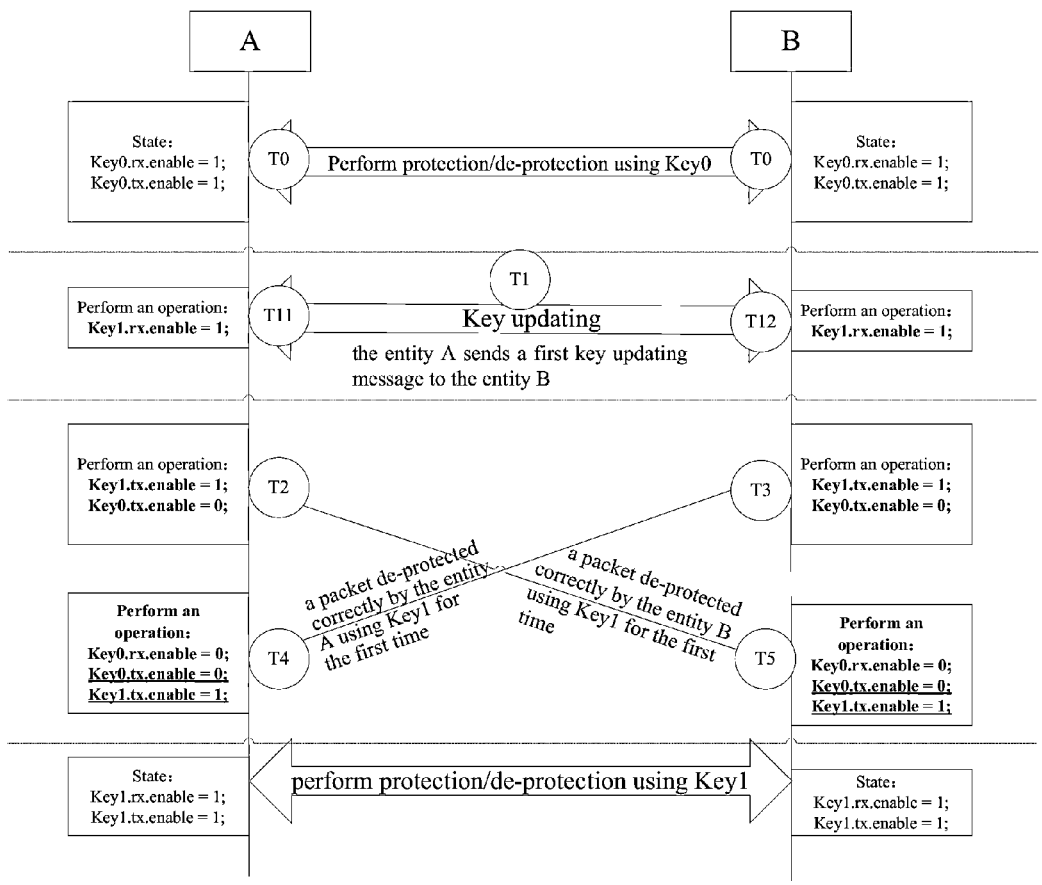
FIG. 3 is a schematic flow chart of a method according to a third embodiment of the present disclosure.

As shown in FIG. 3, a specific implement manner is provided for starting the first key switching process by the end obtaining the new key earlier and the opposite end, in a case that it is deduced by the end obtaining the new key earlier using the above method that the new key is obtained by the opposite end. In this implement manner, the entity A is the end obtaining the new key earlier.

At a time instant T11, the entity A sets the new key Key1 as unavailable in the sending direction and as available in the receiving direction upon reception of Key1 (and keeps Key0 is kept as available both in the sending direction and the receiving direction), and the entity A constructs a first key updating message and sends it to the entity B. At a time instant T12, the entity B receives the first key updating message, obtain the new key Key1 according to the first key updating message, and set the Key1 as unavailable in the sending direction and as available in the receiving direction (and keeps Key0 as available in both the sending direction and the receiving direction).

At a time instant T2, the entity A starts a key switching process, such that the Key1 is set as available in the sending direction, and the Key0 is set as unavailable in the sending direction. Where a time interval between the time instant T2 and the time instant T11 is set to be greater than the transmission delay for the arrival of the first key updating message to the entity B, and thereby T2 is later than T12.

At a time instant T12, the entity B obtains the first key updating message, thereby obtains the new key, and determines that the new key is obtained by the entity A according the first key updating message. A first key switching process is started by the entity B at a time instant T3 of a second time interval later than the time instant T2, such that Key1 is set as available in the sending direction and Key0 is set as unavailable in the sending direction.

Specifically, the second time interval may be zero; in this case, the first key switching process is started by the entity B at the time instant T12. At this point, entity B needs not to set the new key as unavailable in the sending direction.

Thereinafter, at a time instant T4, a second key switching process is started by the entity A after the data sent by the entity B is de-protected successfully using the new key for the first time, and at a time instant T5, a second key switching process is started by the entity B after the data sent by the entity A is de-protected successfully using the new key for the first time.

Second Method

A first key switching process is started, by the end obtaining the new key earlier, at a time instant when data with a serial number that is a first data frame number is sent to the opposite end; wherein the first data frame number is set by the end obtaining the new key earlier and sent to the opposite end through the first key updating message.

Based on this, it is deduced by the end obtaining the new key earlier that the new key is obtained by the opposite end according to the first key updating message when data with the first data frame number is sent to the opposite end.

In communication, data is transmitted in a fixed frame format. The data frame number is used to indicate a serial number of the transmitted data frame, and the data frame is usually increased progressively in the data communication process. For example, in the communication between the entity A and the entity B, a data frame number for data sent by the entity A to the entity B is designated as a data frame number of the entity A, and a data frame number for data sent by the entity B to the entity A is designated as a data frame number of the entity B. There is no correspondence between the data frame number of the entity A and the data frame number of the entity B, but the entity A and the entity B need to keep the current value of the data frame number of itself and the current value of the data frame number of the opposite party, respectively, i.e. the current value of the data frame number of the entity A and the current value of the data frame number of the entity B should be recorded. Data from the entity B is received by the entity A, and a data frame number of the entity B carried in the data cannot be less than the current value of the data frame number of the entity B recorded by the entity A; and data from the entity A is received by the entity B, and a data frame number of the entity A carried in the data cannot be less than the current value of the data frame number of the entity A recorded by the entity B.

Therefore, in present disclosure, the first data frame number is greater than the current value of the data frame number of the end obtaining the new key earlier, i.e. the first data frame number is greater than the maximum of data frame numbers used by the end obtaining the new key earlier before the first key updating message is sent.

In addition, in order to ensure that it can be deduced by the end obtaining the new key earlier that the new key is obtained by the opposite end at a time instant when the data with the first data frame number is sent, in the disclosure, a time interval between the time instant when the data with the serial number that is the first data frame number is sent and a time instant when the first key update message is sent is greater than a transmission delay of the first key update message. Based on this, it can be deduced by the end obtaining the new key earlier that the new key is obtained by the opposite end according to the first key updating message when the data with the first data frame number is sent to the opposite end.

Taking FIG. 3 as an example again, it is assumed that the current value of the data frame number of the end obtaining the new key earlier is 60 when the first key updating message is sent. The time instant T2 is a time instant when the data with the first data frame number is sent, and the time instant T12 is a time instant when the first key updating message arrives at the entity B. The first data frame number should be set to be greater than 60; and the first data frame number should be set to be at least 60+20=80 if 20 data frames can be sent to the opposite end by the end obtaining the new key earlier during the transmission delay of the first key updating message in the current network, and thereby the first data frame number may be set to be 100. It is obvious that a time instant when the data with the data frame number 100 arrives at the entity B is later than T12, and at this time the entity B can use the new key to de-protect the data.

It should be noted that, in the above second method, the opposite end can learn accurately, according to the first data frame number in the first key updating message, that the data frame number of the data which is protected by the end obtaining the new key earlier using the new key for the first time is the first data frame number. At this point, a valid key may be selected by the opposite end according to the data frame number of the received data to de-protect the data. Specifically, the new key is selected to de-protect the data if the data frame number of the received data is the first data frame number or is greater than the first data frame number, or else the original key is selected to de-protect the data.

Specifically, in a specific implement, the data frame number may be designed in a descending order. In contrast to a case of ascending order, data from the entity B is received by the entity A, and a data frame number of the entity B carried in the data cannot be greater than a current value of the data frame number of the entity B recorded by the entity A; the corresponding first data frame number should be set to be less than the current value of the data frame number of the end obtaining the new key earlier, i.e. the corresponding first data frame number is set to be less than the minimum of data frame numbers used by the end obtaining the new key earlier before the first key updating message is sent.

In another embodiment of the present disclosure, the end obtaining the new key earlier may not send the first data frame number to the opposite end. Corresponding to the process that a first key switching process is started by the end obtaining the new key earlier after it is deduced that the new key is obtained by the opposite end, a first key switching process is started by the end obtaining the new key earlier after it is determined that the new key is obtained by the opposite end. A specific method for starting the first key switching process by the end obtaining the new key earlier after it is determined that the new key is obtained by the opposite end is provided according to a fourth embodiment of the present disclosure.

A second key updating message is generated by the opposite end after the new key is obtained according to the above first key updating message.

It is determined by the end obtaining the new key earlier that the new key is obtained by the opposite end according to the second key updating message.

A first key switching process is started by the end obtaining the new key earlier after the second key updating message is received. Specifically, the first key switching process may be started at a time instant of a third time interval after the second key updating message is received. In this case, the first key switching process may be started by the opposite end at a time instant of a second time interval after the first key updating message is received, as described in the third embodiment, and the first key switching process may be started by the opposite end at a time instant of a fourth time interval after the second key updating message is received, or the first key switching process may be started by the opposite end at a time instant when the data with the second data frame number is sent to the end obtaining the new key earlier.

Specifically, the third time interval and the fourth time interval each are not greater than the remaining valid period of the original key.

The second data frame number is set by the opposite end and is sent to the end obtaining the new key earlier through the second key updating message, and the second data frame number is set to be greater than the current value of data frame number of the opposite end, that is, the maximum of data frame numbers used by the opposite end before the second key updating message is sent.

Figure 4:
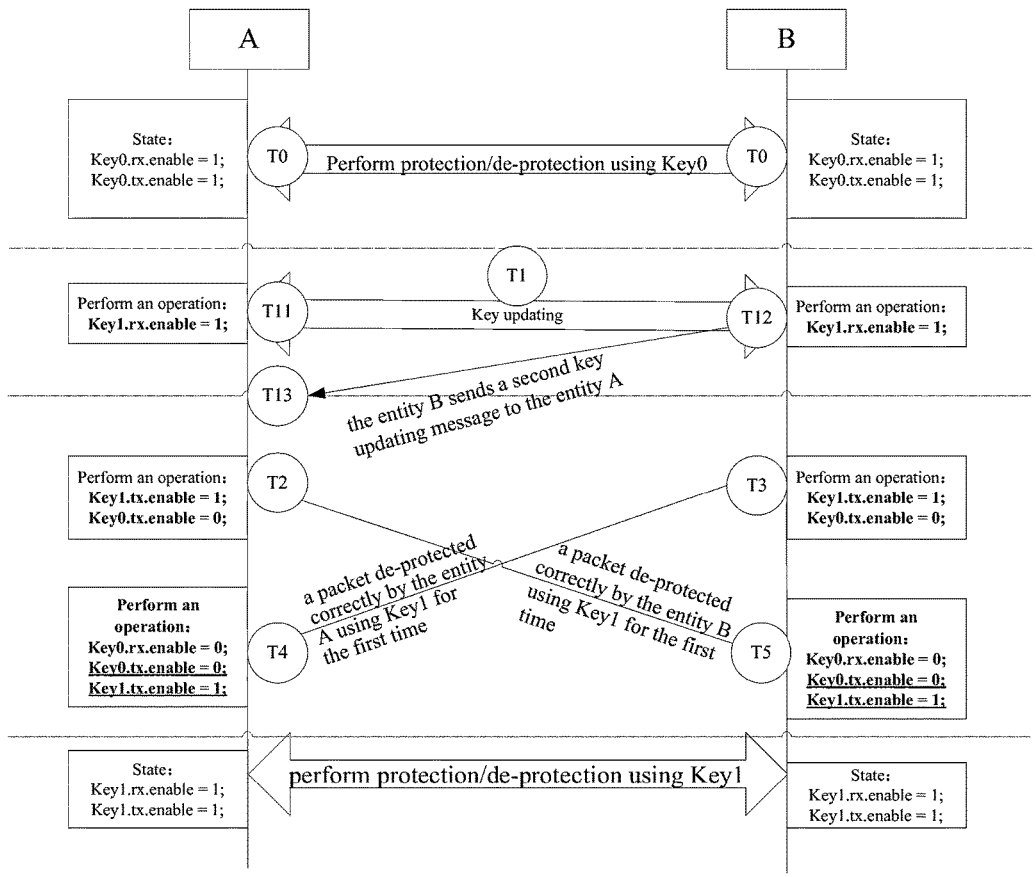
FIG. 4 is a schematic flow chart of a method according to a fourth embodiment of the present disclosure.

Referring to FIG. 4, a specific implement manner is provided for starting the first key switching process by the end obtaining the new key earlier and the opposite end if it is determined by the end obtaining the new key earlier that the new key is obtained by the opposite end according to the second key updating message sent by the opposite end. In this case, the entity A is the end obtaining the new key earlier.

At time instants T0, T11, T12, T4 and T5, the entity A and the entity B perform respectively the same operations as those in FIG. 3. Additionally, at the time instant T12, a second key updating message is constructed and sent to the entity A for informing the entity A that the new key Key1 is obtained, by the entity B, after the new key Key1 is received according to the received first key updating message.

At a time instant T13, the second key updating message is received by the entity A and it is determined by the entity A that the new key Key1 is obtained by the entity B according to the second key updating message.

At a time instant T2 that is the third time interval later/earlier than T13 (a time interval between time instants T13 and T12 is the third time interval), a first key switching process is started by the entity A, wherein the new key Key1 is set as available in the sending direction, and the original key Key0 is set as unavailable in the sending direction, where the time instant T2 is not greater than a remaining valid period of the original key Key0.

Specifically, the third time interval may be zero, and in this case, the first key switching process is started by the entity A at the time instant T13 when the second key updating message is received.

For the entity B, a first key switching process may be started at the time instant T3 that is a second time interval later/earlier than the time instant T12 (a time interval between T12 and T3 is the second time interval), or the first key switching process may be started at a time instant when data with the second data frame number (the second data frame number is not less than a data frame number for sending the second key updating message) is sent to the entity A. For example, if the data frame number at the time of sending the second key updating message is 97, and the second data frame number is set to be 98, the first key switching process is started by the entity B when first data is sent after the second key updating message is sent. Specifically, the second data frame number is sent to the entity A through the second key updating message.

In a preferred embodiment of the present disclosure, either end in a communication link may be configured to send a key updating request message to the opposite end before a new key is obtained, so as to inform the opposite end that the new key is not obtained by the either end and start a key updating process. Therefore, the first key updating message is sent to the opposite end by the end obtaining the new key earlier according to the key updating request message.

The first key updating message may be present in various forms in the above embodiments.

For example, the key updating message is a cipher-text generated by the end obtaining the new key earlier by protecting the new key using shared information of the two parties. The new key can be obtained by the opposite end by de-protecting the cipher-text using the shared information of the two parties.

For example, if the new key is 1, a cipher-text is generated directly by protecting 1, and the new key 1 is obtained directly by the opposite end by de-protecting the cipher-text.

The shared information of the two parties may be the original key, or may be a key shared between the two parties especially for protecting the new key in the key updating process, or public-private key information of the two parties.

In a case that a new key is protected and de-protected using the public-private key of the two parties, the new key is protected by the end obtaining the new key earlier using the public key of the opposite end and the private key of itself; the received key is de-protected by the opposite end using the public key of the end obtaining the new key earlier and the private key of itself.

In a specific implement, in order to protect the forward security of the key, the key updating process is not implemented by protecting the new key using the original key usually.

To protect the first key updating message from being intercepted during transmission such that the new key is revealed, in a preferred embodiment of the present disclosure, the first key updating message may also be a cipher-text generated by the end obtaining the new key earlier by protecting a first parameter using the shared information, wherein the first parameter is a parameter which is used by the end obtaining the new key earlier and the opposite end to calculate the new key, such as a first notification master key.

In a specific application, a key algorithm is agreed between the ends in the communication link; the end obtaining the new key earlier calculates the new key according the agreed key algorithm and the above first parameter. And the opposite end de-protects the new key information to obtain the first parameter and calculate the new key according the agreed key algorithm and the above first parameter.

In this manner, the corresponding key cannot be obtained by a third party directly even through the first key updating message is obtained by the third party.

In a specific embodiment of the present disclosure, the first key updating message may also be a second parameter used to generate the new key; the new key is obtained through the agreed algorithm by the two parties using the second parameter and the common key of the two parties. The shared key of the two parties may be the original key, or may be the key shared by the two parties for key updating process.

In this manner, the shared key is not known to a third party, thus the new key cannot be calculated by the third party, although the second parameter is sent in the form of a plain text.

Specifically, in a preferred embodiment of the present disclosure, the second parameter may be sent after being protected such that the security can be enhanced.

In a specific embodiment of the present disclosure, the above first parameter or the second parameter may be present in several forms, such as data obtained from a key book. To achieve a higher security level, a first random number may be generated for the end obtaining the new key earlier, the end obtaining the new key earlier generates a new key according to the random number and sends the random number to the opposite end, such that the new key can be obtained by the opposite end according to the first random number.

In order to further describe that the new key is generated through negotiation between the two parties, in a preferred embodiment of the present disclosure, the new key may be generated by the each of the two parties in the communication link using the random number generated by the opposite end.

For example, the new key information is a cipher text generated by the end obtaining the new key earlier by protecting a third parameter using the shared information between the end and the opposite end, and the third parameter is a parameter used to generate the new key.

The end obtaining the new key earlier may obtain the new key using the agreed key algorithm, the third parameter and the second random number generated by the opposite end.

The third parameter is obtained by the opposite end by de-protecting the new key information.

The new key is obtained by the opposite end using the agreed key algorithm, the third parameter and the second random number generated by itself.

As another example, the new key information is a fourth parameter, and the fourth parameter is a parameter used to calculate the new key in conjunction with the shared key between the end obtaining the new key earlier and the opposite end.

The new key is obtained by the end obtaining the new key earlier using the agreed key algorithm, the shared key, the fourth parameter and the third random number generated by the opposite end.

The new key is obtained by the opposite end using the agreed key algorithm, the shared key, the fourth parameter and the third random number generated by the opposite end.

Specifically, the opposite end sends the third random number or the fourth random number to the end obtaining the new key earlier through the key updating request message.

In the disclosure, the third parameter or the fourth parameter may be present in various forms, for example the third parameter or the fourth parameter may be data obtained from a key book. To achieve a higher security level, the third parameter or the fourth parameter may be the fourth random number generated by the end obtaining the new key earlier.

In the above embodiments, the second key updating message is a message which is used by the opposite end to inform the end obtaining the new key earlier that the new key is obtained by the opposite end, so the message may not include information related to the new key, such as a notification message similar to "the new key has been obtained".

In a preferred embodiment of the present disclosure, in order that the end obtaining the new key earlier verifies whether the key received by the opposite end is correct, the opposite end may set the new key in the second key updating message, such as "the new key 5 has been obtained", such that the end obtaining the new key earlier may verify whether the key received by the opposite end is correct.

Because the second key updating message includes information related to the new key, a cipher text generated by the opposite end by encrypting the new key using the shared information between the opposite end and the end obtaining the new key earlier may be carried in the second key updating message, or a cipher text generated by the opposite end by encrypting the first parameter received from the first key updating message using the shared information between the opposite end and the end obtaining the new key earlier may be carried in the second key updating message, in order to protect the message from being intercepted during the transmission.

It should be noted that, in a specific embodiment of the present disclosure, the embodiments are illustrated by taking the entity A as the end obtaining the new key earlier and the entity B as the opposite end. However, in a practical application, it is easier to understand that if the entity B obtains the new key earlier, the entity B performs the operation performed by the above entity A, and the entity A performs the operation performed by the above entity B.

After the either end has finished the first key switching process and the second key switching process, the new key becomes the current key of the end, and both the original key and the new key are stored at the end. In order to avoid that the current key cannot be determined accurately when another updating process is performed, in a preferred embodiment of the present disclosure, an appropriate process should be adopted to distinguish the new key and the original key after the first key switching process and the second key switching process. Several process methods are presented below.

A new key may be stored in a permanent storage area for a current key, by the either end, after the key switching process is started. Thereby the current key can be directly determined according to the storage area for the next update.

Alternatively, the original key may be deleted directly, by the either end, after the key switching process is started, such that only one key needs to be stored.

Alternatively, an identifier indicating a current key may be directed to the new key by the either end, so that the current key may be determined according to the identifier.

Corresponding to the above method, a device for implementing the two-key switching is further provided according to a fifth embodiment of the present disclosure.

Figure 5:
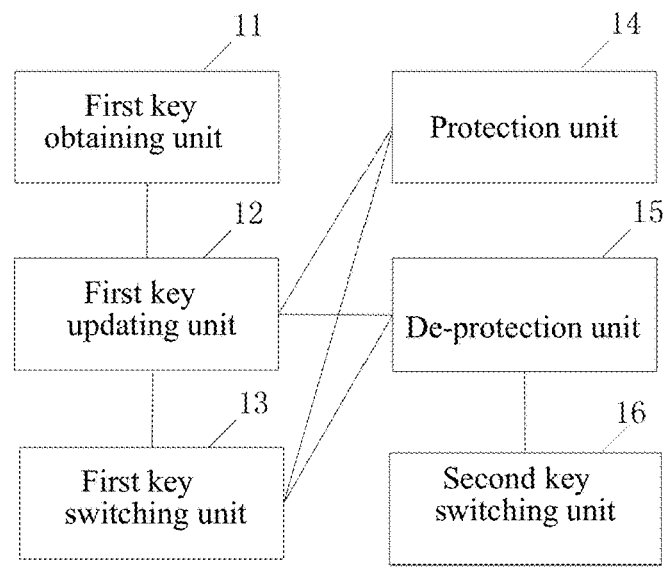
FIG. 5 is a structure diagram of a device according to a fifth embodiment of the present disclosure.

Referring to FIG. 5, the device includes a first key obtaining unit 11, a first key updating unit 12, a first key switching unit 13, a protection unit 14, a de-protection unit 15 and a second key switching unit 16.

The first key obtaining unit 11 is configured to obtaining a new key.

In the disclosure, the key refers to a key for protecting the data to be sent, i.e. encrypting or calculating an integrity check, and for de-protecting the received data, i.e. decrypting or verifying an integrity check.

Since the key is a two-way key, a key used by either end in the communication link to protect sent data is the same as a key used by the either end in the communication link to de-protect received data. For example, assuming that communicating parties are entities A and B, if a key used by the entity A to protect data to be sent to the entity B is 1, a key used by the entity A to de-protect data received from the entity B is 1.

The first key updating unit 12 is configured to set a new key as unavailable in a sending direction and available in a receiving direction, and keep an original key as available in the sending direction and available in the receiving direction, after the new key is obtained by the device and before it is deduced or determined that the new key is obtained by at least n opposite ends, such that a first key switching process is started, by the opposite end, after it is deduced or determined that the new key is obtained by the first key obtaining unit while before the original key becomes invalid; wherein the first key switching process comprises setting the original key as unavailable in the sending direction and setting the new key as available in the sending direction.

In the disclosure, a key available in a sending direction means that the key can be used to protect data, and a key unavailable in a sending direction means that the key cannot be used to protect data. While, a key available in a receiving direction means that the key can be used to de-protect data, a key unavailable in a receiving direction means that the key cannot be used to de-protect data.

For either end in a communication link, a new key may be not obtained by an opposite end when the new key is obtained by the either end, so a communication packet protected using the new key may not be de-protected by the opposite end if the first key updating unit 12 sets the new key as available in a sending direction directly. Thus, in the disclosure, the new key is set as unavailable in the sending direction by the first key updating unit 12, after the new key is obtained by the first key obtaining unit 11. In this case, the protection unit 14 still protects data to be sent to the opposite end using the original key.

The first key switching unit 13 is configured to start a first key switching process, after the new key is obtained and it is deduced or determined that the new key is obtained by at least n opposite ends, while before the original key becomes invalid; wherein the first key switching process comprises setting the original key as unavailable in the sending direction and setting the new key as available in the sending direction, where N≥n≥1, and N is a total number of receivers corresponding to a sender. The opposite end sets the new key as unavailable in the sending direction and sets the new key as available in the receiving direction when the new key is obtained, and selects a valid key according to a protection identifier of received data to de-protect the data.

The new key is set as available in the receiving direction by the opposite end upon reception the new key, i.e. the new key may be used to de-protect the received data. It is deduced or determined by the first key switching unit 13 that the new key may be used to de-protect the data if it is deduced or determined that the new key is obtained by the opposite end, then the first key switching process may be started, and the protection unit 14 of the device may protected the data to be sent using the new key.

A key has a certain lifetime in use, so a first key switching process should be started by the first key switching unit 13 before the original key becomes invalid.

The de-protection unit 15 is configured to select a valid key according to a protection identifier of data sent by the opposite end to de-protect the data.

Since both the new key and the original key are available for the de-protection unit 15 after the new key is set as available in the receiving direction, a valid key is selected according to a protection identifier of the received data to de-protect the data. Specifically, the original key is selected to de-protect the received data if the protection identifier indicates that the data is protected using the original key, or the new key is selected to de-protect the received data if the protection identifier indicates the data is protected using the new key.

The original key becomes unavailable in the receiving direction after the second key switching process is started, and in this case, the de-protection unit selects the new key to de-protect the data.

The second key switching unit 16 is configured to start the second key switching process after the data is successfully de-protected using the new key for the first time, i.e. setting the original key as unavailable in the receiving direction.

The fact that the data is successfully de-protected using the new key for the first time means that the key switching process has been performed by the opposite end, so the second key switching unit 16 may perform a key switching process after the data is successfully de-protected using the new key for the first time, i.e. setting the original key as unavailable in the receiving direction.

A packet loss may occur usually in communication, so a communication packet de-protected by either end using the new key for the first time may not be a first packet protected using the new key and sent by the opposite end.

In a communication network, there are two communication manners including a unicasting manner and a multicasting manner. Specifically, the unicasting manner means that communication data is sent by a single entity to another single entity. The multicasting manner means that communication data is sent by a single entity to at least two entities.

Specifically, in the case of multicasting, the new key may be not obtained by the multiple entities for receiving data at the same time, so the first key switching unit 13 is configured to start the first key switching process after it is deduced or determined that the new key is obtained by all the opposite ends, in order to ensure that the de-protection processes are performed correctly by the above multiple entities, according to a preferred embodiment of the present disclosure.

In the present disclosure, the first key obtaining unit may obtain the new key earlier than the opposite end, or later than the opposite end. If the first key obtaining unit obtains the new key earlier than the opposite end, the device, which is configured to start a key switching process after it is deduced or determined that the new key is obtained by the opposite end, has various specific forms.

Following devices, which are configured to start the first key switching process after it is deduced or determined that the new key is obtained by the opposite end in a case that the new key is obtained by the device earlier, are provided according to a sixth embodiment of the present disclosure.

First Device

A first key updating message sending unit is configured to send a first key updating message comprising new key information to the opposite end, in a case that the new key is obtained by the device earlier than the opposite end. Then the opposite end obtains the new key according to the first key updating message.

The first key switching unit is configured to start the first key switching process at a time instant of a first time interval after the first key updating message is sent. Wherein the first time interval is greater than the transmission delay of the first key updating message.

It takes certain time to transmit data over a communication link. Considering that a transmission delay may occur due to factors such as transmission distance and transmission bandwidth, delay time of the data transmission is determined in the prior art. It is considered that data is transmitted to the opposite end if transmission time is greater than the delay time. Therefore, in the present disclosure, it is deduced that the message is obtained by the opposite end if the transmission time is greater than the delay time for arrival of the first key updating message to the opposite end, and thereby it is deduced that the new key is obtained by the opposite end.

Second Device

A first key updating message sending unit is configured to send a first key updating message comprising new key information to the opposite end, in a case that the new key is obtained by the device earlier than the opposite end. Then the opposite end obtains the new key according to the first key updating message.

The first key switching unit is configured to set a first data frame number and start the first key switching process at a time instant when data with a serial number that is a first data frame number is sent to the opposite end.

The first data frame number is greater than the maximum of data frame numbers used before the first key updating message is sent, and a time interval between the time instant when the data with the first data frame number is sent and a time instant when the first key updating message is sent is greater than the transmission delay for arrival of the first key updating message to the opposite end.

In communication, data is transmitted in a frame format. The data frame number is used to indicate a sequence of the transmitted data frame. The first data frame number is set to be greater than the maximum of data frame numbers used before the first key updating message is sent, and a time interval between the time instant when the data with the first data frame number is sent and a time instant when the first key updating message is sent is greater than the transmission delay for arrival of the first key updating message to the opposite end. Therefore, it is deduced that the opposite end has obtained the new key according to the first key updating message if the data with the first data frame number has been sent to the opposite end.

In the present disclosure, various devices, which are configured to start a key switching process after it is determined that the new key is obtained by the opposite end in a case that the new key is obtained by the device earlier, are provided.

The first key switching unit is configured to start the first key switching process at a time instant of a second time interval after a second key updating message is received, wherein the second key updating message is returned by the opposite end after the new key is obtained according to the first key updating message; wherein the second time interval is not greater than a remaining valid period of the original key.

In a preferred embodiment of the present disclosure, the opposite end may send a key updating request message before the new key is obtained. The first key updating message sending unit is configured to send the first key updating message to the opposite end according to the key updating request message.

To ensure the security of the new key information in the first key updating message sent to the opposite end, the device further includes a new key unit configured to generate the new key information by protecting the new key using information shared with the opposite end, in an embodiment of the present disclosure.

For example, if the new key is 1, first new key information is generated directly by protecting 1, and the new key 1 is obtained by the opposite end by de-protecting the new key information using the shared information.

Alternatively, to protect the first key updating message from being intercepted during transmission causing the new key to be revealed, in a preferred embodiment of the present disclosure, the device may further include a first parameter unit configured to generate new key information by protecting a first parameter using the information shared with the opposite end. Specifically, the first parameter is a parameter used to generate the new key, such as a first notification master key NMK. In this case the first key obtaining unit is configured to obtain the new key according to the agreed key algorithm and the first parameter.

Alternatively, the new key information is a second parameter, wherein the second parameter is a parameter used to obtain the new key in conjunction with the shared key which is shared with the opposite end. In this case, the first key obtaining unit is configured to obtain the new key according to the agreed key algorithm, the second parameter and the shared key.

The first parameter or the second parameter can be present in several forms, such as data obtained from a key book. To achieve a higher security level, the first parameter or the second parameter may be a first random number generated by a first random number unit.

The shared information of the two parties may be the original key, or may be a key shared between the two parties especially for protecting the new key in the key updating process, or public-private key information of the two parties.

In a case that a new key is protected and de-protected using the public-private key of the two parties, the new key is protected using the public key of the opposite end and the private key of itself; the received key is de-protected by the opposite end using the public key of the other end and the private key of itself.

In a specific implement, in order to protect the forward security of the key, the key updating process is not implemented by protecting the new key using the original key usually.

In order to further describe that the new key is generated through negotiation between the two parties, in a preferred embodiment of the present disclosure, the new key may be generated by each of the two parties in the communication link using the random number generated by the opposite end.

Specifically, the device further includes a third parameter unit configured to generate the new key information by protecting a third parameter using information shared with the opposite end, wherein the third parameter is a parameter used to generate the new key. In this case, the first key obtaining unit is configured to obtain the new key according to the agreed key algorithm, the third parameter and a second random number generated by the opposite end.

Alternatively, the first key obtaining unit is configured to obtain the new key according to the agreed key algorithm, a fourth parameter, the key shared with the opposite end and a third random number generated by the opposite end, in a case that the new key information is the fourth parameter. The fourth parameter is a parameter used to calculate the new key in conjunction with the key shared with the opposite end.

The second random number or the third random number is generated by the opposite end and is included in the key updating request message.

In an embodiment of the disclosure, the third parameter or the fourth parameter may be present in various forms. For example, the parameter may be data obtained from a key book. To achieve a higher security level, the parameter may be a fourth random number generated by a fourth random number unit.

The second key updating message mentioned in the device is a message which is used by the opposite end to inform that the new key is obtained by the opposite end, so the message may not include information related to the new key, such as a notification message similar to "the new key has been obtained".

In a preferred embodiment of the present disclosure, in order that the end obtaining the new key earlier verifies whether the key received by the opposite end is correct, the opposite end may set the new key in the second key updating message, such as "the new key 5 has been obtained", such that the end obtaining the new key earlier may verify whether the key received by the opposite end is correct. Because the second key updating message includes the new key, the new key in the second key updating message may be protected by the opposite end using the shared information between the two ends, in order to protect the message from being intercepted during the transmission. For example, a cipher text generated by the opposite end by protecting the new key using the shared information may be carried in the second key updating message, or a cipher text generated by the opposite end by protecting a related parameter received from the first key updating message using the shared information may be carried in the second key updating message.

After the key switching process, the new key becomes the current key of the device, and both the original key and the new key are stored in the device. In order to avoid that the current key cannot be determined accurately when another subsequent updating process is performed, in a preferred embodiment of the present disclosure, an appropriate process should be adopted after the key switching process to distinguish the new key and the original key. Correspondingly, the device further includes:

a current key storing unit, an original key deleting unit or a current key identifier unit.

The current key storing unit is configured to store the new key in a permanent storage area for a current key after the first key switching process and the second key switching process is started.

The original key deleting unit is configured to delete the original key after the first key switching process and the second key switching process is started.

The current key identifier unit is configured to direct the identifier indicating the current key to the new key after the first key switching process and the second key switching process is started.

Figure 6:
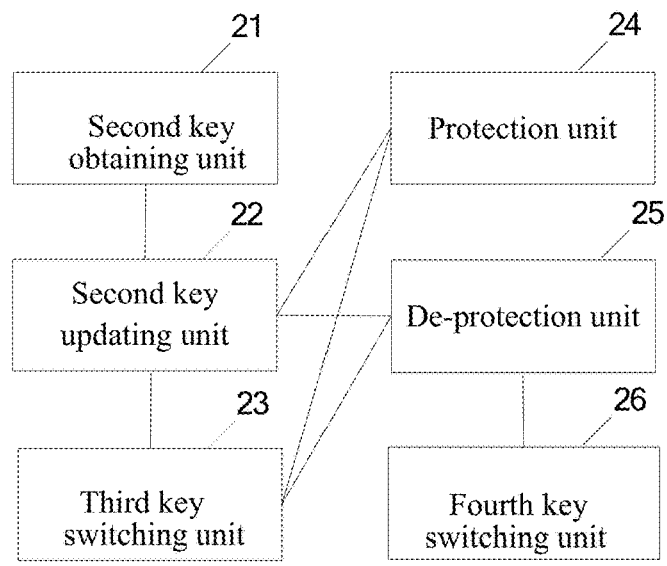
FIG. 6 is a structure diagram of a device according to a seventh embodiment of the present disclosure.

Corresponding to the above method, referring to FIG. 6, a device for two-way key switching is provided according to the seventh embodiment of the present disclosure, and the device includes: a second key obtaining unit 21, a second key updating unit 22, a third key switching unit 23, a protection unit 24, a de-protection unit 25 and a fourth key switching unit 26.

The second key obtaining unit 21 is configured to obtain a new key according to a first key updating message comprising key information, wherein the first key updating message is sent by an opposite end in a case that the opposite end obtains the new key earlier.

The second key updating unit 22 is configured to set the new key as unavailable in a sending direction and set the new key as available in a receiving direction, and keep an original key as available in the sending direction and keep the original key as available in the receiving direction when the new key is obtained; such that a first key switching process is started, by the opposite end, after it is deduced or determined that the new key is obtained by the second key obtaining unit, while before the original key becomes invalid; wherein the first key switching process comprises setting the original key as unavailable in the sending direction and setting the new key as available in the sending direction. In this case, if it is needed to send data to the opposite end, the protection unit 24 still protects the data to be sent using the original key.

The third key switching unit 23 is configured to start a first key switching process at a time instant of a second time interval after the new key is obtained according to the first key updating message, for setting the original key as unavailable in the sending direction and setting the new key as available in the sending direction; so that the opposite end starts the second key switching process after the received data is successfully de-protected using the new key for the first time, for setting the original key as unavailable in the receiving direction. And the opposite end sets the new key as unavailable in the sending direction and sets the new key as available in the receiving direction and selects a valid key to de-protect the received data according to a protection identifier of the received data, when the new key is obtained. In this case, if it is needed to send data to the opposite end, the protection unit 24 protects the data to be sent using the new key.

The second time interval is not greater than a remaining valid period of the original key.

It should be noted that, the first key switching process is directly started by the opposite end after the new key is obtained according to the first key updating message if the second time interval is zero, at this time the opposite end needs not to set the new key as unavailable in the sending direction.

The de-protection unit 25 is configured to select a corresponding key based on a protection identifier of the data sent by the opposite end to de-protect the data.

The fourth key switching unit 26 is configured to start a second key switching process, after the data sent by the opposite end is successfully de-protected using the new key for the first time, wherein the second key switching process comprises setting the original key as unavailable in the receiving direction.

In a preferred embodiment of the present disclosure, in order to inform the end acquiring the new key earlier that the new key is obtained by the second key obtaining unit, the device further includes a second key updating message sending unit.

The second key updating message sending unit is configured to send a second key updating message to the opposite end after the new key is obtained according to the first key updating message, so that the opposite end determines that the new key is obtained by the second key obtaining unit according to the second key updating message The third key switching unit is configured to start the first key switching process at a time instant of a third time interval after the second key updating message is sent. Alternatively, the third key switching unit is configured to set a second data frame number and start the first key switching process at a time instant when data with the second data frame number is sent to the opposite end.

The third time interval is not greater than the remaining valid period of the original key.

The second key data frame number is included in the second key updating message, and the second data frame number is set to be greater than the maximum of data frame numbers used before the second key updating message is sent.

In another embodiment of the present disclosure, the device further includes a key updating request sending unit.

The key updating request sending unit is configured to send a key updating request message to the opposite end before the new key is obtained, such that the opposite end sends the first key updating message according the key updating request message in a case that the opposite end obtains the new key earlier.

Since the new key information in the first key updating message has various forms, the manners in which the new key is obtained by the second key obtaining unit may vary.

For example, in a case that the new key information is a cipher-text that is obtained by the opposite end by protecting the new key using the information shared with the other end in the communication link, the second key obtaining unit is configured to obtain the new key by de-protecting the new key information using the shared information.

For another example, in a case that the new key information is a cipher-text that is obtained by the opposite end by protecting the first parameter using the information shared with the other end in the communication link, the second key obtaining unit is configured to obtain the first parameter by de-protecting the new key information, and obtain the new key using the agreed key algorithm and the first parameter; wherein the first parameter is a parameter used to generate the new key, such as a first notification master key NMK.

For another example, if the new key information is a second parameter, the second key obtaining unit is configured to obtain the new key using the agreed key algorithm, the second parameter and the key shared with the other end in the communication link; wherein the second parameter is a parameter used to calculate the new key in conjunction with the shared key.

In a specific embodiment of the present disclosure, the above first or second parameter may be present in several forms, such as data obtained from a key book. To achieve a higher security level, the above first or second parameter may be a first random number generated by the opposite end.

In order to indicate that the new key is generated through the negotiation between the two parties, in a preferred embodiment of the present disclosure, the new key may be generated by the two ends using the random number generated by the device.

Specifically, the device further includes a second random number unit configured to generate a second random number.

In a case that the new key information is a cipher-text that is obtained by the opposite end by protecting the third parameter using the information shared with the other end in the communication link, the second key obtaining unit is configured to obtain the third parameter by de-protecting the new key information, and obtain the new key using the agreed key algorithm, the third parameter and the second random number; wherein the third parameter is a parameter used to generate the new key.

Alternatively, the device further includes a third random number unit configured to generate a third random number.

If the new key information is a fourth parameter, the second key obtaining unit is configured to obtain the new key using the agreed key algorithm, the fourth parameter, the key shared with the other end in the communication link and the third random number; wherein the fourth parameter is a parameter used to obtain the new key in conjunction with the key shared with the other end in the communication link.

The above third or fourth parameter may be present in several forms, such as data obtained from a key book. To achieve a higher security level, the above third or fourth parameter may be a fourth random number generated by the opposite end. The second random number and the third random number are included in the key updating request message. It should be noted that, the methods of the present disclosure are corresponding to the devices of the present disclosure, thereby the devices will not described in detail, and for a part of the device, reference may be made to the above description of the corresponding part of the method. The embodiments of the present disclosure are described in detail above. The disclosure is described through the specific embodiments, and the description of the above embodiment is only intended to help understanding the devices and the methods of the disclosure. Variations may be made to the specific embodiment and the application scope by those skilled in the art based on the idea of the present disclosure.

Thereby, the content of the specification should not be considered as limiting the scope of the disclosure.

The invention claimed is:

1. A two-way key switching method, comprising:
   setting, by an end in a communication link, a new key as unavailable in a sending direction and available in a receiving direction, and keeping, by the end, an original key as available in the sending direction and available in the receiving direction, after reception of the new key, while before it is deduced or determined that the new key is obtained by an opposite end;
   starting, by the end, a first key switching process after reception of the new key and it is deduced or determined that the new key is obtained by the opposite end, while before the original key becomes invalid; wherein the first key switching process comprises setting the original key as unavailable in the sending direction and setting the new key as available in the sending direction;
   selecting, by the end, a valid key according to a protection identifier of data sent by the opposite end to de-protect the data; and
   starting, by the end, a second key switching process, when the data is successfully de-protected using the new key for the first time, wherein the second key switching process comprises setting the original key as unavailable in the receiving direction,
   wherein each end comprises a transmitter that transmits messages and data, and a receiver that receives messages and data.

2. The method according to claim 1, further comprising:
   sending, by the end, a first key updating message comprising new key information to the opposite end for the opposite end to obtain the new key, wherein, the end is an end obtaining the new key earlier.

3. The method according to claim 2,
   wherein the process of starting, by the end, the first key switching process, after it is deduced or determined that the new key is obtained by the opposite end, while before the original key becomes invalid comprises:
   starting, by the end obtaining the new key earlier, the first key switching process at a time instant of a first time interval after the first key updating message is sent, for the opposite end to start the first key switching process at a time instant of a second time interval after the new key is obtained according to the first key updating message;
   or,
   wherein the process of starting, by the end, the first key switching process, after it is deduced or determined that the new key is obtained by the opposite end while before the original key becomes invalid comprises:
   starting, by the end obtaining the new key earlier, the first key switching process at a time instant when data with a first data frame number is sent to the opposite end, for the opposite end to start the first key switching process at a time instant of a second time interval after the new key is obtained according to the first key updating message;
   wherein the first time interval is greater than a transmission delay of the first key updating message;
   the first data frame number is set by the end obtaining the new key earlier, and is greater than the maximum of data frame numbers used by the end obtaining the new key earlier before the first key updating message is sent, and the time interval between the time instant when the data with the first data frame number is sent and a time instant when the first key update message is sent is greater than the transmission delay of the first key update message; and
   the second time interval is not greater than a remaining valid period of the original key.

4. The method according to claim 2,
   in a case that the opposite end sends a second key updating message to the end obtaining the new key earlier after the new key is obtained according to the first key updating message,
   the process of starting, by the end, the first key switching process, after it is deduced or determined that the new key is obtained by the opposite end while before the original key becomes invalid comprises:
   starting, by the end obtaining the new key earlier, the first key switching process at a time instant of a third time interval after the second key updating message is received, for the opposite end to start the first key switching process at a time instant of a fourth time interval after the second key updating message is sent;
   or,
   the process of starting, by the end, the first key switching process, after it is deduced or determined that the new key is obtained by the opposite end while before the original key becomes invalid comprises:
   starting, by the end obtaining the new key earlier, the first key switching process at a time instant of a third time interval after the second key updating message is received, for the opposite end to start the first key switching process at the time instant when data with a second data frame number is sent to the end obtaining the new key earlier;
   wherein both the third time interval and the fourth time interval is not greater than the remaining valid period of the original key; and
   the second data frame number is set by the opposite end and is sent to the end obtaining the new key earlier through the second key updating message, and the second data frame number is set to be greater than the maximum of data frame numbers used by the opposite end before the second key updating message is sent.

5. The method according to claim 2,
   wherein, the opposite end sends a key updating request message to the end before the new key is obtained;
   wherein the process of sending, by the end obtaining the new key earlier, the first key updating message to the opposite end comprise:
   sending, by the end obtaining the new key earlier, the first key updating message to the opposite end according to the key updating request message when the new key is obtained.

6. The method according to claim 1, further comprising:
   storing the new key in a permanent storage area for a current key, deleting the original key, or directing an identifier indicating a current key to the new key, by the end, after the end starts the first key switching process and the second key switching process.

7. A device for implementing two-way key switching, comprising:
   a first key obtaining unit configured to obtain a new key;
   a first key updating unit configured to set a new key as unavailable in a sending direction and set the new key as available in a receiving direction, and keep an original key as available in the sending direction and keep the original key as available in the receiving direction, after the new key is obtained by the device while before it is deduced or determined that the new key is obtained by an opposite end;
a first key switching unit configured to start a first key switching process, after the new key is obtained and it is deduced or determined that the new key is obtained by the opposite end, while before the original key becomes invalid; wherein the first key switching process comprises setting the original key as unavailable in the sending direction and set the new key as available in the sending direction;
a protection unit configured to protect data to be sent to the opposite end using the original key, in a case that the new key is set as unavailable in the sending direction and the original key is set as available in the sending direction, or protect data to be sent to the opposite end using the new key, in a case that the original key is set as unavailable in the sending direction and the new key is set as available in the sending direction;
a de-protection unit configured to select a corresponding key according to a protection identifier of the data sent by the opposite end to de-protect the data; and
a second key switching unit configured to start a second key switching process, when the data sent by the opposite end is successfully de-protected using the new key for the first time, wherein the second key switching process comprises setting the original key as unavailable in the receiving direction,
wherein the device comprises a transmitter that transmits messages and data, and a receiver that receives messages and data.

8. The device according to claim 7, further comprising:
a first key updating message sending unit configured to send a first key updating message comprising new key information to the opposite end, in a case that the new key is obtained by the device earlier than the opposite end, such that the opposite end obtains the new key according to the first key updating message.

9. The device according to claim 8,
wherein the first key switching unit is configured to start the first key switching process at a time instant of a first time interval after the first key updating message is sent by the first key updating message sending unit; or
wherein the first key switching unit is configured to set a first data frame number and start the first key switching process at a time instant when data with the first data frame number is sent to the opposite end by the first key updating message sending unit; wherein the first time interval is greater than a transmission delay of the first key updating message, the first data frame number is greater than the maximum of data frame numbers used before the first key updating message is sent, and a time interval between the time instant when the data with the first data frame number is sent and a time instant when the first key updating message is sent is greater than the transmission delay of the first key updating message.

10. The device according to claim 8,
wherein the first key switching unit is configured to start the first key switching process at a time instant of a second time interval after a second key updating message is received, wherein the second key updating message is returned by the opposite end after the new key is obtained according to the first key updating message;
wherein the second time interval is not greater than a remaining valid period of the original key.

11. The device according to claim 8,
wherein the first key updating message sending unit is configured to send the first key updating message to the opposite end according to a key updating request message; wherein the key updating request message is sent by the opposite end before the new key is obtained.

12. The device according to claim 7, further comprising:
any one of a current key storing unit, an original key deleting unit and a current key identifier unit, wherein
the current key storing unit is configured to store the new key in a permanent storage area for a current key after the first key switching process and the second key switching process is started;
the original key deleting unit is configured to delete the original key after the first key switching process and the second key switching process is started; and
the current key identifier unit is configured to direct the identifier indicating the current key to the new key after the first key switching process and the second key switching process is started.

13. A device for implementing two-way key switching, comprising:
a second key obtaining unit configured to obtain a new key according to a first key updating message comprising new key information, wherein the first key updating message is sent by an opposite end in a case that the opposite end obtains the new key earlier;
a second key updating unit configured to set the new key as unavailable in a sending direction and set the new key as available in a receiving direction, and keep an original key as available in the sending direction and keep the original key as available in the receiving direction, when the new key is obtained;
a third key switching unit configured to start a first key switching process at a time instant of a second time interval after the new key is obtained according to the first key updating message; wherein the first key switching process comprises setting the original key as unavailable in the sending direction and setting the new key as available in the sending direction;
a protection unit configured to protect data to be sent to the opposite end using the original key, in a case that the new key is set as unavailable in the sending direction and the original key is set as available in the sending direction, or protect data to be sent to the opposite end using the new key, in a case that the original key is set as unavailable in the sending direction and the new key is set as available in the sending direction;
a de-protection unit configured to select a corresponding key based on a protection identifier of the data sent by the opposite end to de-protect the data; and
a fourth key switching unit configured to start a second key switching process, when the data is successfully de-protected using the new key for the first time, wherein the second key switching process comprises setting the original key as unavailable in the receiving direction;
wherein the second time interval is not great than a remaining valid period of the original key,
wherein the device comprises a transmitter that transmits messages and data, and a receiver that receives messages and data.

14. The device according to claim 13, further comprising:
a second key updating message sending unit configured to send a second key updating message to an end obtaining the new key earlier after the new key is obtained according to the first key updating message, wherein the third key switching unit is configured to start the first key switching process at a time instant of a third time interval after the second key updating message is sent;

or, the third key switching unit is configured to set a second data frame number and start the first key switching process at a time instant when data with the second data frame number is sent to the opposite end;

wherein the third time interval is not greater than the remaining valid period of the original key; and the second data frame number is greater than the maximum of data frame numbers used before the second key updating message is sent.

15. The device according to claim 13, further comprising:
a key updating request message sending unit configured to send a key updating request message to the opposite end before the new key is obtained, such that the opposite end sends the first key updating message according the key updating request message in a case that the opposite end obtains the new key earlier.

16. The method according to claim 1, wherein, the protection identifier comprises a key identifier or a key index which is used to identify that the data is protected by using which key.

17. The device according to claim 7, wherein, the protection identifier comprises a key identifier or a key index which is used to identify that the data is protected by using which key.

18. The device according to claim 13, wherein, the protection identifier comprises a key identifier or a key index which is used to identify that the data is protected by using which key.

19. The method according to claim 1, wherein,
obtaining, by the end, the new key according to a first key updating message sending by the opposite end; wherein, the end is not an end obtaining the new key earlier.

20. The method according to claim 19,
wherein the process of starting, by the end, the first key switching process, after it is deduced or determined that the new key is obtained by the opposite end, while before the original key becomes invalid comprises:
starting, by the end, the first key switching process at a time instant of a second time interval after the new key is obtained according to the first key updating message, which is sent by the opposite end before the opposite end starts the first key switching process at a time instant of a first time interval;
or,
wherein the process of starting, by the end, the first key switching process, after it is deduced or determined that the new key is obtained by the opposite end while before the original key becomes invalid comprises:
in a case that the opposite end obtaining the new key earlier starts the first key switching process at a time instant when data with a first data frame number is sent to the end, starting, by the end, the first key switching process at a time instant of a second time interval after the new key is obtained according to the first key updating message;
wherein the first time interval is greater than a transmission delay of the first key updating message;
the first data frame number is set by the opposite end obtaining the new key earlier, and is greater than the maximum of data frame numbers used by the opposite end obtaining the new key earlier before the first key updating message is sent, and the time interval between the time instant when the data with the first data frame number is sent and a time instant when the first key update message is sent is greater than the transmission delay of the first key update message; and
the second time interval is not greater than a remaining valid period of the original key.

21. The method according to claim 19, further comprising:
sending, by the end, a second key updating message to the opposite end obtaining the new key earlier after the new key is obtained according to the first key updating message;
wherein the process of starting, by the end, the first key switching process, after it is deduced or determined that the new key is obtained by the opposite end while before the original key becomes invalid comprises:
starting, by the end, the first key switching process at a time instant of a fourth time interval after the second key updating message is sent, for the opposite end to start the first key switching process at a time instant of a third time interval after the second key updating message is received;
or,
wherein the process of starting, by the end, the first key switching process, after it is deduced or determined that the new key is obtained by the opposite end while before the original key becomes invalid comprises:
in a case that the opposite end obtaining the new key earlier starts the first key switching process at a time instant of a third time interval after the second key updating message is received, starting, by the end, the first key switching process at the time instant when data with a second data frame number is sent to the opposite end obtaining the new key earlier;
wherein both the third time interval and the fourth time interval is not greater than the remaining valid period of the original key; and
the second data frame number is set by the end and is sent to the opposite end obtaining the new key earlier through the second key updating message, and the second data frame number is set to be greater than the maximum of data frame numbers used by the end before the second key updating message is sent.

22. The method according to claim 2, further comprising:
sending, by the end, a key updating request message to the opposite end before the new key is obtained;
obtaining, by the end, the first key updating message sent by the opposite end obtaining the new key earlier according to the key updating request message when the new key is obtained.

23. The method according to claim 1, wherein there are N opposite ends of the end comprising said opposite end, where N is a total number of receivers corresponding to the end as a sender and N >1, wherein the method comprising:
setting, by the end in a communication link, the new key as unavailable in the sending direction and available in the receiving direction, and keeping, by the end, the original key as available in the sending direction and available in the receiving direction, after reception of the new key, while before it is deduced or determined that the new key is obtained by at least n opposite ends, where N ≥n ≥1;
starting, by the end, the first key switching process after reception of the new key and it is deduced or determined that the new key is obtained by at least n opposite ends, while before the original key becomes invalid; wherein the first key switching process comprises setting the original key as unavailable in the sending direction and setting the new key as available in the sending direction;

selecting, by the end, the valid key according to the protection identifier of data sent by the opposite end to de-protect the data; and starting, by the end, the second key switching process, after the data is successfully de-protected using the new key for the first time, wherein the second key switching process comprises setting the original key as unavailable in the receiving direction.

24. The device according to claim 7, wherein there are N opposite ends of the device comprising said opposite end, where N is a total number of receivers corresponding to the device as a sender and N >1, wherein the device comprising:

the first key obtaining unit configured to obtain the new key;

The first key updating unit configured to set the new key as unavailable in the sending direction and set the new key as available in the receiving direction, and keep the original key as available in the sending direction and keep the original key as available in the receiving direction, after the new key is obtained by the device while before it is deduced or determined that the new key is obtained by at least n opposite ends, where N ≥n ≥1;

the first key switching unit configured to start the first key switching process, after the new key is obtained and it is deduced or determined that the new key is obtained by at least n opposite ends, while before the original key becomes invalid; wherein the first key switching process comprises setting the original key as unavailable in the sending direction and set the new key as available in the sending direction;

the protection unit configured to protect data to be sent to the opposite end using the original key, in a case that the new key is set as unavailable in the sending direction and the original key is set as available in the sending direction, or protect data to be sent to the opposite end using the new key, in a case that the original key is set as unavailable in the sending direction and the new key is set as available in the sending direction;

the de-protection unit configured to select the corresponding key according to the protection identifier of the data sent by the opposite end to de-protect the data; and the second key switching unit configured to start the second key switching process, after the data sent by the opposite end is successfully de-protected using the new key for the first time, wherein the second key switching process comprises setting the original key as unavailable in the receiving direction.

* * * * *

UNITED STATES PATENT AND TRADEMARK OFFICE
CERTIFICATE OF CORRECTION

Page 1 of 1

PATENT NO. : 10,263,771 B2
APPLICATION NO. : 14/420342
DATED : April 16, 2019
INVENTOR(S) : Manxia Tie et al.

It is certified that error appears in the above-identified patent and that said Letters Patent is hereby corrected as shown below:

On the Title Page

At item (73) Assignee "China IWNCOMM Co., LTD., Xi'an, Shannxi (CN)" should read --China IWNCOMM Co., LTD., Xi'an, Shaanxi (CN)--.

Signed and Sealed this
Second Day of July, 2019

Andrei Iancu
*Director of the United States Patent and Trademark Office*